United States Patent [19]

Colafati

[11] Patent Number: 5,010,116

[45] Date of Patent: Apr. 23, 1991

[54] WATER BLOWN FOAM

[76] Inventor: Ralph Colafati, 46 Knollwood Dr., Branford, Conn. 06405

[21] Appl. No.: 471,857

[22] Filed: Jan. 29, 1990

[51] Int. Cl.$^5$ ............................................. C08G 18/00
[52] U.S. Cl. .................... 521/155; 502/164; 521/110
[58] Field of Search ............... 521/115, 118, 902, 155, 521/110; 528/54; 548/49; 502/164

[56] References Cited

U.S. PATENT DOCUMENTS 4,760,099 7/1988 Canaday et al. .................... 521/110
4,904,629 2/1990 Galla et al. .......................... 502/164

Primary Examiner—John Kight, III
Assistant Examiner—Duc Truong
Attorney, Agent, or Firm—Lieberman Rudolph & Nowak

[57] ABSTRACT

The subject invention provides a urethane foam which does not require chlorofluorocarbons to manufacture and which conforms to the Montreal Protocol. The compositions of the subject invention are usable in a spray and a pourable form, and may be used in a variety of applications such as in the production of building panels, marine floatation, and roofing materials.

30 Claims, No Drawings

WATER BLOWN FOAM

BACKGROUND OF THE INVENTION

Urethane foam is used in architectural building panels, marine floatation, sprayed-on roof materials, and as insulation for the tops of buildings both to prevent leaking and to provide insulation.

The Montreal Protocol, an agreement signed by most of the world's developed nations in 1987, pledges to cut the use of chlorofluorocarbons in the production of urethane foam in half by 1998. It is anticipated that this summer the agreement will be strengthened to totally ban the use of chlorfluorocarbons by the year 2000. In addition, Congress has recently increased taxes on chlorofluorocarbon products. Therefore, alternative sources of foam producing material must be employed. Current replacements for chlorofluorocarbons increase the cost of producing urethane foams. Accordingly, a need currently exists for a low cost method of producing these foams.

The subject invention provides a composition which produces a rigid foam when combined with diphenylmethane diisocyanate in less than stoichiometric amounts. The use of substoichiometric amounts of diphenylmethane diisocyanate is unknown in the prior art, and allows for the production of lower density water blown foam. The subject invention provides a water blown foam having a commercially valuable density of from about 1.5 lb/ft$^3$ to about 4 lb/ft$^3$. In summary, the subject invention offers a low cost, environmentally safe alternative to conventional urethane foams.

SUMMARY OF THE INVENTION

The subject invention provides a urethane foam which does not require chlorofluorocarbons to manufacture. Two embodiments of this invention are disclosed.

The first embodiment is a foam composition which comprises an oxyalkylated glycerine having a hydroxyl number of from about 56 to about 300, an oxypropylated aromatic based mannich condensate, an organic surfactant, an amine catalyst, a polyisocyanate catalyst, and a quaternary ammonium salt or a triazine.

The second embodiment is a foam composition which comprises an oxyalkylated glycerine having a hydroxyl number of from about 56 to about 300, a rigid polyether polyol with a functionality greater than 3.8 and a hydroxyl number of from about 300 to about 500, a polyalkyleneoxidemethylsiloxane copolymer, an amine catalyst, a polyisocyanurate catalyst, and a quaternary ammonium salt or a triazine.

DETAILED DESCRIPTION OF THE INVENTION

The compositions of the subject invention produce a foam when mixed with substoichiometric amounts of polymeric MDI. In the preferred embodiment, the compositions of the subject invention are mixed in a ratio of about 1:1 with polymeric MDI. MDI is diphenylmethane diisocyanate which is known in the art to produce a foam when combined with compositions containing viscosity modifiers and polyol. At 1:1 MDI is present in substoichiometric amounts. A mixture of MDI and a composition of the subject invention may be obtained using standard equipment known to persons skilled in the art.

The subject invention provides a composition useful for producing a foam which comprises an oxyalkylated glycerine having a hydroxyl number of from about 56 to about 300, an oxypropylated aromatic based mannich condensate, an organic surfactant, an amine catalyst, a polyisocyanate catalyst, and a quaternary ammonium salt or a triazine. The above composition is to be mixed with water, and the components are preferably present in amounts effective to produce a foam when mixed with diphenylmethane diisocyanate.

In preferred embodiments the compounds are present in the amounts stated below:

The oxyalkylated glycerine having a hydroxyl number of from about 56 to about 300 is present in the range of from about 40% to about 70% by weight of the composition. The oxyalkylated glycerine having a hydroxyl number of from about 56 to about 300 is a viscosity modifier. The most preferred compound of this type is LHT-240 which is produced by Union Carbide.

The oxypropylated aromatic based mannich condensate is present in the range of from about 30% to about 60% by weight of the composition. 350X is the preferred compound and is produced by Arco Chemical. This compound is a rigid spray polyol, and is useful for producing the cross-linking required to manufacture rigid foams.

The organic surfactant is present in the range of from about 0.5% to about 1.5% by weight of the composition. Organic surfactants are well known to those skilled in the art and are readily determinable. Both silicone and non-silicone organic surfactants may be utilized. However, non-silicone organic surfactants are preferred. The most preferred compound is LK-443 which manufactured by Air Products. A surfactant is utilized for stabilizing and forming cell structure. The amine catalyst is present in the range of from about 0.1% to about 1.0% by weight of the composition. N,N-dimethylcyclohexylamine is the preferred amine catalyst. N,N-dimethylcyclohexylamine is available as polycat-8, referred to in the trade as PC-8, which is produced by Air Products. The amine catalyst initiates the reaction between the above-identified composition and the isocyanate. Tertiary and delayed action amines, such as triethylene diamine and triethanol amine may also be employed.

The polyisocyanate catalyst employed may be any known in the art. It is preferred, however, that the isocyanate catalyst is lead, present in the form of 24% lead naphthanate which is present in the range of from about 0.1% to about 0.5% by weight of the composition. Other heavy metal catalysts, tin catalysts, and potassium catalysts may also be employed.

Water is present in the range of from about 0.4% to about 4.0% by weight of the composition.

The quaternary ammonium salt and/or triazine is the key component to provide a stable low density, water blown foam. It is preferred that the quaternary ammonium salt is TMR, however, other compounds such as Polycat 41, Polycat 43, or Dabco HB may be used.

In the preferred embodiments, TMR, which is a quaternary ammonium salt of a carboxylic acid, is present in the range of from about 0.1% to about 3% by weight of the composition. TMR is manufactured by Air Products. TMR is a trimerization catalyst and is available as TMR 1, TMR 2, TMR 3, and TMR 4. The lower the number which follows TMR, the slower the reaction time.

The most preferred embodiment is sprayable foam which comprises about 47.50% by weight of LHT-240; about 47.25% by weight of 350X; about 1.00% by weight of LK-443; about 0.25% by weight of PC-8; about 0.20% by weight of 24% lead naphthanate; about 2.80% by weight of water; and about 1.00% by weight of TMR.

A second composition useful for producing foam is also provided which comprises an oxyalkylated glycerine having a hydroxyl number of from about 56 to about 300, a rigid polyether polyol with a functionality greater than 3.8 and a hydroxyl number of from about 300 to about 500, a polyalkyleneoxidemethylsiloxane copolymer, an amine catalyst, a polyisocyanurate catalyst and a quaternary ammonium salt or a triazine. The above composition is to be mixed with water, and the components are preferably present in amounts effective to produce a foam when mixed with diphenylmethane diisocyanate.

In preferred embodiments the compounds are present in the amounts stated below:

The oxyalkylated glycerine having a hydroxyl number of from about 56 to about 300 is present in the range of from about 40% to about 70% by weight of the composition.

The rigid polyether polyol with a functionality greater than 3.8 and a hydroxyl number of from about 300 to about 500 is present in the range of from about 30% to about 60% by weight of the composition. Most preferably, this compound is 74-532 which is manufactured by Olin Corporation.

The polyalkylenoxidemethylsiloxane copolymer is present in the range of from about 1.0% to about 1.5% by weight of the composition. The most preferred compound is L-5420 which produced by Union Carbide. L-5420 functions to improve mixing and to form fine cell structure.

The amine catalyst is present in the range of from about 0.1% to about 1.0% by weight of the composition.

Water is present in the range of from about 0.4% to about 4.0% by weight of the composition.

The polyisocyanurate catalyst is present in the range of from about 0.5% to about 1.5% by weight of the composition. Most preferably, the catalyst is Curithane 52 which is manufactured by Air Products. It is a final curative and functions to increase adhesion and thermal stability.

In the preferred embodiment, the quaternary ammonium salt is TMR, which is present in the range of from about 0.1% to about 3.0% by weight of the composition. As in the first composition, TMR may be present as TMR 1, TMR 2, TMR 3, or TMR 4.

The subject invention also provides foams comprising either of the two above-identified compositions and diphenylmethane diisocyanate. The first composition is preferably a sprayable composition which is useful in the roofing and insulation industries. The second composition is preferably a pourable composition which is useful in producing blocks of foam for insulation and marine floatation, among other things.

The subject invention also provides a process for producing a foam which comprises mixing the above-identified compositions with diphenylmethane diisocyanate.

The following Experimental Detail Section is set forth to aid in the understanding of the subject invention and is not intended to limit or restrict the invention in any manner.

EXPERIMENTAL DETAIL

In conventional urethane foams, low density is produced through the use of chlorofluorocarbon blowing agents. Until now the use of water blown foams has been limited to high density foams, i.e. about 10 lb/ft$^3$ or greater. The reason for this is that an excess of isocynate has been used to react with the water thereby producing $CO_2$.

The subject invention provides a low density foam using a substoichiometric amount of isocyanate. This unexpected result provides a basis for the subject invention.

An index of 100 indicates a 1:1 stoichiometric ratio. The urethane foams of the prior art have isocyanate indices of greater than 100. The higher the index, the greater the excess of the first component, i.e. isocyanate.

Foam samples produced by mixing various ratios of polymeric MDI (A side) and the preferred spray foam composition of the subject invention (B side). The foams produced the various ratios were then tested for resistance to cold and heat.

The B side of the subject invention consisted of:

| | |
|---|---|
| 47.50% | LHT-240 |
| 47.25% | 350X |
| 1.00% | LK-443 |
| 0.25% | PC-8 |
| 0.20% | 24% lead naphthanate |
| 2.80% | water |
| 1.00% | TMR-3 |

As a control, a B side was prepared which did not contain a quaternary ammonium salt or a triazine, i.e. the above-identified B side without TMR-3. This control B side, although not known in the prior art, represents a typical water blown foam.

The following ratios of A:B were tested:

| A/B | Isocyanate Index |
|---|---|
| 60/100 | 50 |
| 80/100 | 67 |
| 100/100 | 83 |
| 120/100 | 100 |
| 140/100 | 117 |

Foams were made at each of the above indices and were allowed to cure for 24 hours at 72° F., in an atmosphere of 50% relative humidity. Two sets of foam were tested, one using the preferred sprayable foam composition of the subject invention, the second using the same composition without TMR-3.

Samples were cut into 2 inch square cubes and subjected to temperatures of 20° F. A second set of samples were subjected to temperatures of 250° F.

The following table summarizes the results obtained:

TABLE 1

| Ratio of A/B | Isocyanate Index | Amount of Shrinkage 20° F. | | Time Until the Onset of Shrinkage 250° F. | |
|---|---|---|---|---|---|
| | | w/TMR | w/o TMR | w/TMR | w/o TMR |
| 60/100 | 50 | None* | Slight* | None* | <1 hour |
| 70/100 | 67 | None* | Slight* | None* | <1 hour |
| 100/100 | 83 | None* | Slight* | None* | <6 hours |
| 120/100 | 100 | None* | None* | None* | Minimal* |
| 140/100 | 117 | None* | None* | None* | None* |

*After 18 days, conclusion of the experiment.

The above experiment demonstrates that conventional water blown foams are not useful at isocyanate indices below 100, whereas, the compositions of the subject invention provide lighter, commercially useful, foams using substoichiometric amounts of isocyanate. The pourable foam composition of the subject invention demonstrated similar results when tested under like conditions.

Although the subject invention has been described in considerable detail with reference to certain preferred versions, other versions are possible. Therefore, the spirit and scope of the appended claims should not be limited to preferred embodiment contained herein.

What is claimed is:

1. A composition useful for producing foam which comprises an oxyalkylated glycerine having hydroxyl number of from about 56 to about 300, an oxypropylated aromatic based mannich condensate, an organic surfactant, an amine catalyst, a polyisocyanate catalyst, and a quaternary ammonium salt or a triazine.

2. A composition of claim 1 further comprising water.

3. A composition of claim 1, wherein the glycerine, condensate, surfactant, amine catalyst, polyisocyanate catalyst, and quaternary ammonium salt or triazine, are present in amounts effective to produce a foam when mixed with diphenylmethane diisocyanate.

4. A composition of claim 1, wherein the oxyalkylated glycerine is present in the range of from about 40% to about 70% by weight of the composition.

5. A composition of claim 1, wherein the oxypropylated aromatic based mannich condensate is present in the range of from about 30% to about 60% by weight of the composition.

6. A composition of claim 1, wherein the organic surfactant is present in the range of from about 0.5% to about 1.5% by weight of the composition.

7. A composition of claim 1, wherein the amine catalyst is present in the range of from about 0.1% to about 1.0% by weight of the composition.

8. A composition of claim 10, wherein the amine catalyst is PC-8.

9. A composition of claim 1, wherein the isocyanate catalyst is 24% lead naphthanate which is present in the range of from about 0.1% to about 0.5% by weight of the composition.

10. A composition of claim 2, wherein water is present in the range of from about 0.4% to about 4.0% by weight of the composition.

11. A composition of claim 1, wherein the quaternary ammonium salt is TMR, which is present in the range of from about 0.1% to about 3.0% by weight of the composition.

12. A composition useful for producing foam which comprises an oxyalkylated glycerine having a hydroxyl number of from about 56 to about 300, a rigid polyether polyol with a functionality greater than 3.8 and a hydroxyl number of from about 300 to about 500, a polyalkyleneoxidemethylsiloxane copolymer, an amine catalyst, a polyisocyanurate catalyst, and a quaternary ammonium salt or a triazine.

13. A composition of claim 12 further comprising water.

14. A composition of claim 12, wherein the glycerine, polyether polyol, polyalkyleneoxidemethylsiloxane copolymer, amine catalyst, polyisocyanurate catalyst, and quaternary ammonium salt or triazine, are present in amounts effective to produce a foam when mixed with diphenylmethane diisocyanate.

15. A composition of claim 12, wherein the oxyalkylated glycerine is present in the range of from about 40% to about 70% by weight of the composition.

16. A composition of claim 12, wherein the polyether polyol is present in the range of from about 30% to about 60% by weight of the composition.

17. A composition of claim 12, wherein the polyalkyleneoxidemethylsiloxane copolymer is present in the range of from about 1.0% to about 1.5% by weight of the composition.

18. A composition of claim 12, wherein the amine catalyst is present in the range of from about 0.1% to about 1.0% by weight of the composition.

19. A composition of claim 18, wherein the amine catalyst is PC-8.

20. A composition of claim 13, wherein water is present in the range of from about 0.4% to about 4.0% by weight of the composition.

21. A composition of claim 12, wherein the quaternary ammonium salt is TMR, which is present in the range of from about 0.1% to about 3.0% by weight of the composition.

22. A composition of claim 12, wherein the polyisocyanurate catalyst is present in the range of from about 0.5% to about 1.5% by weight of the composition.

23. A foam comprising the composition of claim 1 and diphenylmethane diisocyanate.

24. A foam comprising the composition of claim 12 and diphenylmethane diisocyanate.

25. A process for producing a foam which comprises mixing the composition of claim 1 with diphenylmethane diisocyanate.

26. A process of claim 25, wherein the diphenylmethane diisocyanate is present in substoichiometric amounts.

27. A process for producing a foam which comprises mixing the composition of claim 16 with diphenylmethane diisocyanate.

28. A process of claim 27, wherein the diphenylmethane diisocyanate is present in substoichiometric amounts.

29. A foam of claim 23 which is sprayable.

30. A foam of claim 24 which is pourable.

* * * * *